(12) United States Patent
Li et al.

(10) Patent No.: US 12,498,297 B2
(45) Date of Patent: Dec. 16, 2025

(54) TEST DEVICE AND METHOD FOR TESTING AND COMMISSIONING COMPREHENSIVE PERFORMANCE OF ROTARY DRILLING RIG

(71) Applicant: XUZHOU XUGONG FOUNDATION CONSTRUCTION MACHINERY CO., LTD., Xuzhou (CN)

(72) Inventors: Jun Li, Xuzhou (CN); Yan Lv, Xuzhou (CN); Qiang Liu, Xuzhou (CN); Dechun Ping, Xuzhou (CN); Lihua Han, Xuzhou (CN); Tong Chang, Xuzhou (CN); Jie Zhou, Xuzhou (CN); Gang Zhang, Xuzhou (CN); Hui Chen, Xuzhou (CN); Yaqing Mu, Xuzhou (CN)

(73) Assignee: XUZHOU XUGONG FOUNDATION CONSTRUCTION MACHINERY CO., LTD., Xuzhou (CN)

( * ) Notice: Subject to any disclaimer, the term of this patent is extended or adjusted under 35 U.S.C. 154(b) by 460 days.

(21) Appl. No.: 18/012,654

(22) PCT Filed: Dec. 3, 2020

(86) PCT No.: PCT/CN2020/133620
§ 371 (c)(1),
(2) Date: Dec. 23, 2022

(87) PCT Pub. No.: WO2021/258649
PCT Pub. Date: Dec. 30, 2021

(65) Prior Publication Data
US 2023/0251166 A1 Aug. 10, 2023

(30) Foreign Application Priority Data
Jun. 23, 2020 (CN) .......................... 202010577474.8

(51) Int. Cl.
*G01M 99/00* (2011.01)
*E21B 3/02* (2006.01)

(52) U.S. Cl.
CPC ............. *G01M 99/005* (2013.01); *E21B 3/02* (2013.01)

(58) Field of Classification Search
None
See application file for complete search history.

(56) References Cited

U.S. PATENT DOCUMENTS 5,902,077 A * 5/1999 Halder ................ B23Q 1/5481
408/100
9,696,198 B2 * 7/2017 Turner .................... E21B 44/00

FOREIGN PATENT DOCUMENTS

CN 1587937 A 3/2005
CN 101915676 A 12/2010
(Continued)

*Primary Examiner* — John E Breene
*Assistant Examiner* — Nigel H Plumb
(74) *Attorney, Agent, or Firm* — Bayramoglu Law Offices LLC

(57) ABSTRACT

A test device for testing and commissioning comprehensive performance of a rotary drilling rig is provided. Dynamometer motors in the test device are provided on a foundation. A torque transmission gearbox is fixed on a gearbox anchoring plate through a gearbox adapter plate. A speed-increasing corner gearbox is provided on the torque transmission gearbox and connected to the dynamometer motors through a transmission shaft, a torque sensor, and a motor coupling sequentially. A drive sleeve is provided in a connecting shaft of the torque transmission gearbox. A lower end of the drive sleeve is connected to a hydraulic loading cylinder through a rotating bearing, a rotating support, and a tension-pressure sensor. The rotating support is fixed in the foundation. The hydraulic loading cylinder is connected to a hydraulic sta-
(Continued)

tion through a hydraulic pipe. The tension-pressure sensor and a pressure control valve are connected to a computer software control system.

10 Claims, 3 Drawing Sheets

(56) References Cited

FOREIGN PATENT DOCUMENTS

| | | | |
|---|---|---|---|
| CN | 102706673 | A | 10/2012 |
| CN | 202633967 | U | 12/2012 |
| CN | 103207079 | A | 7/2013 |
| CN | 104236945 | A | 12/2014 |
| CN | 107727406 | A | 2/2018 |
| CN | 208847492 | U | 5/2019 |
| CN | 111721566 | A | 9/2020 |
| EP | 3581911 | A1 | 12/2019 |

* cited by examiner

TEST DEVICE AND METHOD FOR TESTING AND COMMISSIONING COMPREHENSIVE PERFORMANCE OF ROTARY DRILLING RIG

CROSS REFERENCE TO THE RELATED APPLICATIONS

This application is the national phase entry of International Application No. PCT/CN2020/133620, filed on Dec. 3, 2020, which is based upon and claims priority to Chinese Patent Application No. 202010577474.8, filed on Jun. 23, 2020, the entire contents of which are incorporated herein by reference.

TECHNICAL FIELD

The present disclosure relates to the field of rotary drilling rigs, in particular, to a test device and method for testing and commissioning comprehensive performance of a rotary drilling rig based on electrical dynamometer and energy recovery.

BACKGROUND

As a construction machine for hole-forming operation in building foundation engineering, the rotary drilling rig has been widely applied to boring construction of such stratigraphic textures as floury soil, cohesive soil, sandy soil, gravels, silt, pebbles and rocks, and operates under complicated conditions.

At present, there have been two main off-line commissioning methods for the rotary drilling rig, namely, borehole commissioning and integrated testbed commissioning. Due to space occupation and the torque only up to 20% of a designed value, the borehole commissioning has an undesirable effect and cannot determine whether technical parameters meet design requirements.

The existing hydraulic dynamometer integrated testbed provides a brand-new commissioning method for the commissioning test through which parameters such as the torque, rotational speed, and power of a power head and the lifting power and pressurizing force of a drill pipe can be detected online. However, with a torque load provided by a hydraulic dynamometer, the method has a relatively stable load and a slow loading speed and cannot simulate abrupt load changes due to stratigraphic fluctuations in actual working conditions, such that the commissioning environment differs from the actual working conditions to some extent.

Moreover, higher requirements have been imposed on the commissioning of the complete machine. In addition to loading as per actual working conditions (fast load changing speed and capability of automatically loading a high-frequency alternating load), there is a further need to monitor parameters such as the pressure of the primary pump, the pressure of the secondary pump, the forward rotating pressure of the power head, the temperature of the hydraulic oil, the water temperature of the engine, the rotational speed of the engine, the torque of the engine, and the oil consumption of the engine during the commissioning to timely monitor whether the complete machine in the simulated actual working conditions is normal and meets acceptance criteria.

Besides the higher commissioning requirements, a comprehensive performance test device is also desired in the development and design of a new product. To verify and calibrate parameters of the new product, both an engine performance test and a hydraulic power matching test are essential to timely monitor and record such host parameters as the torque of the power head, the rotational speed of the power head, the pressure of the primary pump, the pressure of the secondary pump, the rotational speed of the engine, the output power of the engine, the output torque of the engine, and the oil consumption of the engine, and fit the characteristic curves of relevant parameters. Therefore, it is desired to provide a test device that is very sensitive to load change, controlled more accurately, able to simulate the actual working conditions, and more powerful in comprehensive data analysis.

SUMMARY

Given the shortages of the prior art, the present disclosure provides a test device for testing and commissioning the comprehensive performance of a rotary drilling rig.

The present disclosure is achieved through the following technical solutions:

A test device for testing and commissioning the comprehensive performance of a rotary drilling rig includes:
- dynamometer motors provided on a foundation;
- a torque transmission gearbox fixed on a gearbox anchoring plate through a gearbox adapter plate;
- a speed-increasing corner gearbox provided on the torque transmission gearbox and connected to the dynamometer motors through a transmission shaft, a torque sensor, and a motor coupling sequentially; and
- a drive sleeve provided in a connecting shaft of the torque transmission gearbox, where a lower end of the drive sleeve is connected to a hydraulic loading cylinder through a rotating bearing I, a rotating support, and a tension-pressure sensor, and the hydraulic loading cylinder is connected to a hydraulic station through a hydraulic pipe.

The tension-pressure sensor and a pressure control valve for the loading cylinder in the hydraulic station are connected to a computer software control system. The torque sensor is connected to the computer software control system. The dynamometer motors are in parallel connection with a power grid in a distribution room and a water-cooling resistance box.

Further, two dynamometer motors are respectively connected to the speed-increasing corner gearbox through the motor coupling, the torque sensor, and the transmission shaft for transmission. The two dynamometer motors are provided on a motor base, and the motor base is provided on a motor base anchoring plate pre-buried in the foundation and is fastened by a foundation bolt.

Further, the hydraulic loading cylinder is connected to a cylinder support through a hinge pin, and the cylinder support is fixed on a cylinder support anchoring plate pre-buried in the foundation.

Further, a guide mechanism is provided at each of two sides of the rotating support. The guide mechanism includes a guide anchoring plate, a guide member, a guide member support, and an adjustment backing plate. The guide anchoring plate is pre-buried in a foundation wall, and guide anchoring plates on two sides are parallel to each other. The adjustment backing plate is provided on the guide anchoring plate, and a guide key is fastened on the adjustment backing plate. Each of the two sides of the rotating support is provided with the guide member support and the guide member, a key slot is formed in the guide member, and the key slot matches the guide key on the adjustment backing plate.

Further, the test device further includes a cooling system, where the cooling system includes a cooling water tank, a pipe, and a water pump. The cooling water tank is connected to the water pump, the water-cooling resistance box, the hydraulic station, and a gear oil pump station through the pipe.

Further, the test device further includes a lubricating system. The torque transmission gearbox and the speed-increasing corner gearbox are respectively connected to the gear oil pump station. An oil supply temperature sensor, an oil discharge temperature sensor, and an oil discharge pressure sensor of the gear oil pump station are connected to the computer software system.

Further, a square head of a drill pipe of the rotary drilling rig is connected to the drive sleeve, such that torque is transmitted to the connecting shaft through the drive sleeve. A rotating bearing II is connected to the connecting shaft, and the rotating bearing II is engaged with a pinion, such that power is transmitted to the speed-increasing corner gearbox through the pinion.

Further, a data acquisition system is connected to a host electronic control unit (ECU) of the rotary drilling rig to timely detect host parameters in a working state of each of the rotary drilling rigs of different types.

Further, the dynamometer motors are connected to the water-cooling resistance box and the power grid through a frequency changer. A flow direction of electric energy generated by the dynamometer motors is controlled by the computer system and the frequency changer, such that a preset percentage of the electric energy is returned to the power grid for utilization and the remaining percentage of the electric energy is used for heating water in a water storage tank through the water-cooling resistance box to clean a vehicle.

A test method for testing and commissioning the comprehensive performance of a rotary drilling rig includes the following steps:
  connecting a square head of a drill pipe of the rotary drilling rig to a drive sleeve, such that torque is transmitted to a connecting shaft through the drive sleeve;
  connecting a rotating bearing II to the connecting shaft and engaging the rotating bearing II with a pinion, such that power is transmitted to a speed-increasing corner gearbox through the pinion;
  transmitting, by the speed-increasing corner gearbox, the torque to dynamometer motors through a transmission shaft, a torque sensor, and a motor coupling; and receiving, by a computer, a torque signal from the torque sensor and directly controlling the dynamometer motors through software, thereby controlling a load and realizing a torque loading test of the complete machine;
  transmitting, by the drill pipe, a pressurizing force and a lifting force to a hydraulic loading cylinder through the drive sleeve, a rotating bearing I, a rotating support, and a tension-pressure sensor; and setting and controlling, by the computer, a pressurizing load and a lifting load of the hydraulic loading cylinder, thereby realizing a lifting and pressurizing test of the drill pipe; and
  reserving, by a data acquisition system, a controller area network (CAN) communication path to connect a host ECU of the rotary drilling rig to timely detect various host parameters in a working state of each of rotary drilling rigs of different types.

The various parameters automatically generate corresponding characteristic curves for data statistics and analysis. The electric energy from the generators is used in two ways: 1. The electric energy is used for heating water to clean a vehicle. 2. The electric energy is returned to the power grid of the company for daily use, thereby saving energy. Upon completion of the test, generated energy can be cumulatively recorded on a display of the frequency changer.

The present disclosure achieves the following beneficial effects:

1. The testbed can simulate actual working conditions automatically according to a load spectrum for the torque loading test. During automatic simulation for the loading test, the present disclosure timely monitors various host parameters of the rotary drilling rig under different load torques, including the torque of a power head, the rotational speed and power of the power head, the pressure of a primary pump, the pressure of a secondary pump, the forward rotating pressure of the power head, the rotational speed of an engine, the torque of the engine, and the temperature of the hydraulic oil, and fits the measured parameters with characteristic curves to check whether the parameters meet acceptance requirements. The present disclosure first uses alternating-current (AC) generators as loads in China, has a millisecond-level sensitivity for load control, and can provide a high-frequency alternating load and an abrupt changing load. Consequently, in case of an abrupt change of the load torque, the present disclosure can timely monitor the impact resistance of the hydraulic system and the stability of the complete machine.

During construction of the rotary drilling rig, such parameters as a lifting force of the main winch, a pressurizing force and a lifting force of a pressurizing cylinder of the power head, and a pressurizing force and a lifting force of a pressurizing winch are considerations for construction efficiency. The testbed is provided with a novel rotating, pressurizing, and guiding compound mechanism for performing simultaneous rotation and pressurization during the commissioning of the rotary drilling rig, thus detecting whether the lifting force and pressurizing force of the rotary drilling rig under different torque loads meet acceptance criteria.

2. The present disclosure creates a novel application field to which the power feedback technology is applied and recycles the energy. The dynamometer motors that provide loads for the torque loading test are substantively generators. While actual working conditions are simulated according to the load spectrum to automatically perform the torque loading test, the energy of a fuel is converted into mechanical energy through the engine, hydraulic system, mechanical transmission system, and so on, thereby driving the dynamometer motors to generate electric energy. The electric energy can be distributed freely by an operating system according to any proportion. Specifically, a certain proportion of the electric energy is used for heating water in a water storage tank to clean a vehicle, and the remaining proportion of the electric energy is returned to a power grid of the company for routine production. While meeting loading and commissioning requirements for simulating the actual working conditions, the testbed solves the problem that the energy of a fuel consumed by the rotary drilling rig cannot be recycled in the conventional borehole commissioning and conventional hydraulic dynamometer integrated testbed commissioning, which opens up a novel application field to which the power feedback technology is applied.

3. The present disclosure provides a high-end testbed for the development and design of the novel product. Torque values can be input manually on the testbed for loading. During the development and design of the novel product, when corresponding relationships between the rotational speed of the power head, the power of the power head, the pressure of the primary pump, and the pressure of the secondary pump are tested under a given torque, control software of the testbed can output characteristic curves of various parameters for data statistics and analysis.

The testbed can acquire such parameters as the rotational speed of the engine, the torque of the engine, the pressure of the primary pump, the displacement of the primary pump, and the rotational speed of the power head under different torques and pressures, automatically fits the output characteristic curves of the engine, pump and motor in a working state of the system, and compares the output characteristic curves with given characteristic curves of the manufacturer to detect whether the hydraulic system matches the selected model of the hydraulic system and obtain the hydraulic efficiency, all of which are of great significance to optimize the product design and improve the product performance.

The testbed can measure the maximum output torque of the rotary drilling rig, the maximum lifting force of the main winch, the maximum lifting force and the maximum pressurizing force of the pressurizing winch, and the maximum pressurizing force and the maximum lifting force of the pressurizing cylinder, which provides more accurate data to support accurate adjustment of the parameters, optimization of the product design, and improvement of the product quality and performance.

4. The reliability test on the drill pipe is realized. Stress-strain induction patches are attached at different positions of the drill pipe. When a load is applied to the rotary drilling rig according to the load spectrum in the simulated actual working conditions, the present disclosure timely detects and records the stress and strain of each patch and analyzes stress distribution of the drill pipe in construction, which provides critical data to support research to find a more reliable and durable drill pipe and solve cracking of the drill pipe.

BRIEF DESCRIPTION OF THE DRAWINGS

The accompanying drawings constituting a part of the present disclosure provide a further understanding of the present disclosure. The embodiments of the present disclosure and description thereof are intended to be illustrative of the present disclosure and do not constitute an undue limitation of the present disclosure. In the accompanying drawings.

Figure 1:
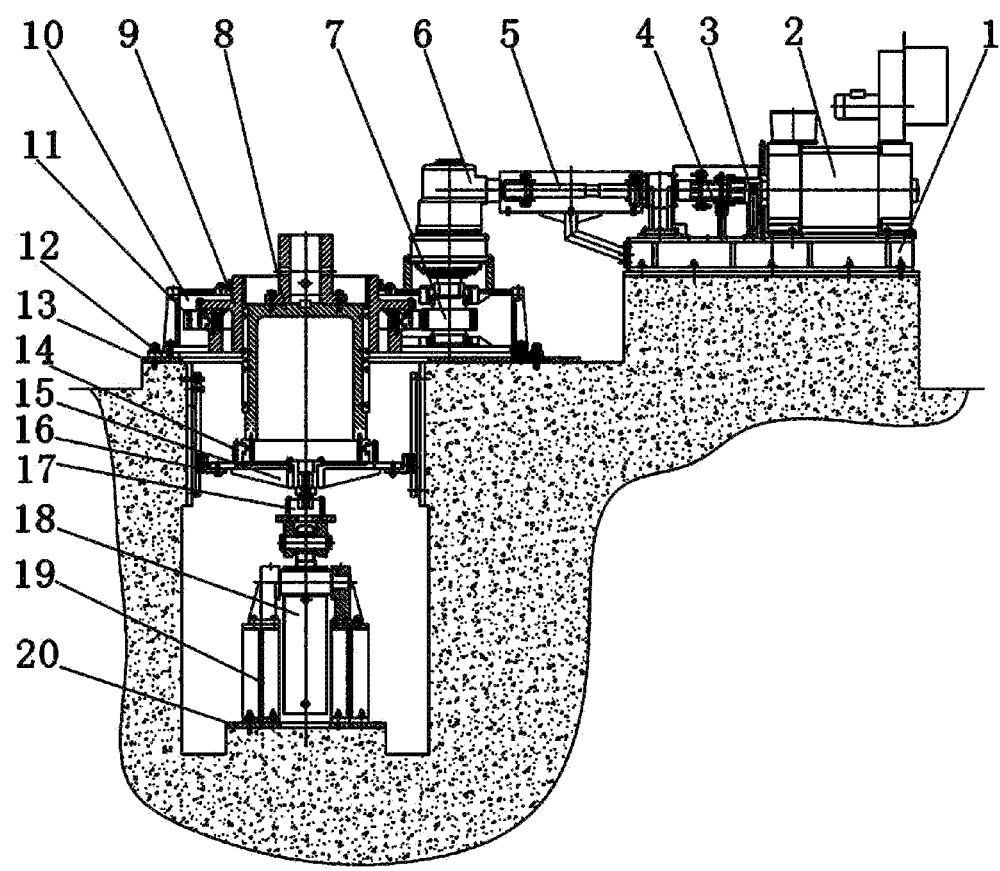
FIG. 1 is a connection diagram of a test device for testing and commissioning the comprehensive performance of a rotary drilling rig.

1—motor base, 2—dynamometer motor, 3—motor coupling, 4—torque sensor, 5—transmission shaft, 6—speed-increasing corner gearbox, 7—pinion, 8—drive sleeve, 9—connecting shaft, 10—torque transmission gearbox, 11—rotating bearing II, 12—gearbox adapter plate, 13—gearbox anchoring plate, 14—rotating bearing I, 15—rotating support, 16—guide mechanism, 17—tension-pressure sensor, 18—hydraulic loading cylinder, 19—cylinder support, 20—cylinder support anchoring plate, 161—guide anchoring plate, 162—guide member, 163—guide member support, 164—adjustment backing plate, and 165—guide key.

DETAILED DESCRIPTION OF THE EMBODIMENTS

To make the objectives, technical solutions, and advantages of the present disclosure clear, the technical solutions in the embodiments of the present disclosure are further described in detail below in combination with the accompanying drawings in the embodiments of the present disclosure. Reference numerals that are the same or similar throughout the accompanying drawings represent the same or similar elements or elements with the same or similar functions. The described embodiments are some, rather than all, of the embodiments of the present disclosure. The examples described below in combination with the accompanying drawings are exemplary and are intended to explain the present disclosure but should not be construed as a limitation to the present disclosure. All other embodiments obtained by those of ordinary skill in the art based on the embodiments of the present disclosure without creative efforts shall fall within the protection scope of the present disclosure. The embodiments of the present disclosure are described in detail below in combination with the accompanying drawings.

Figure 2:
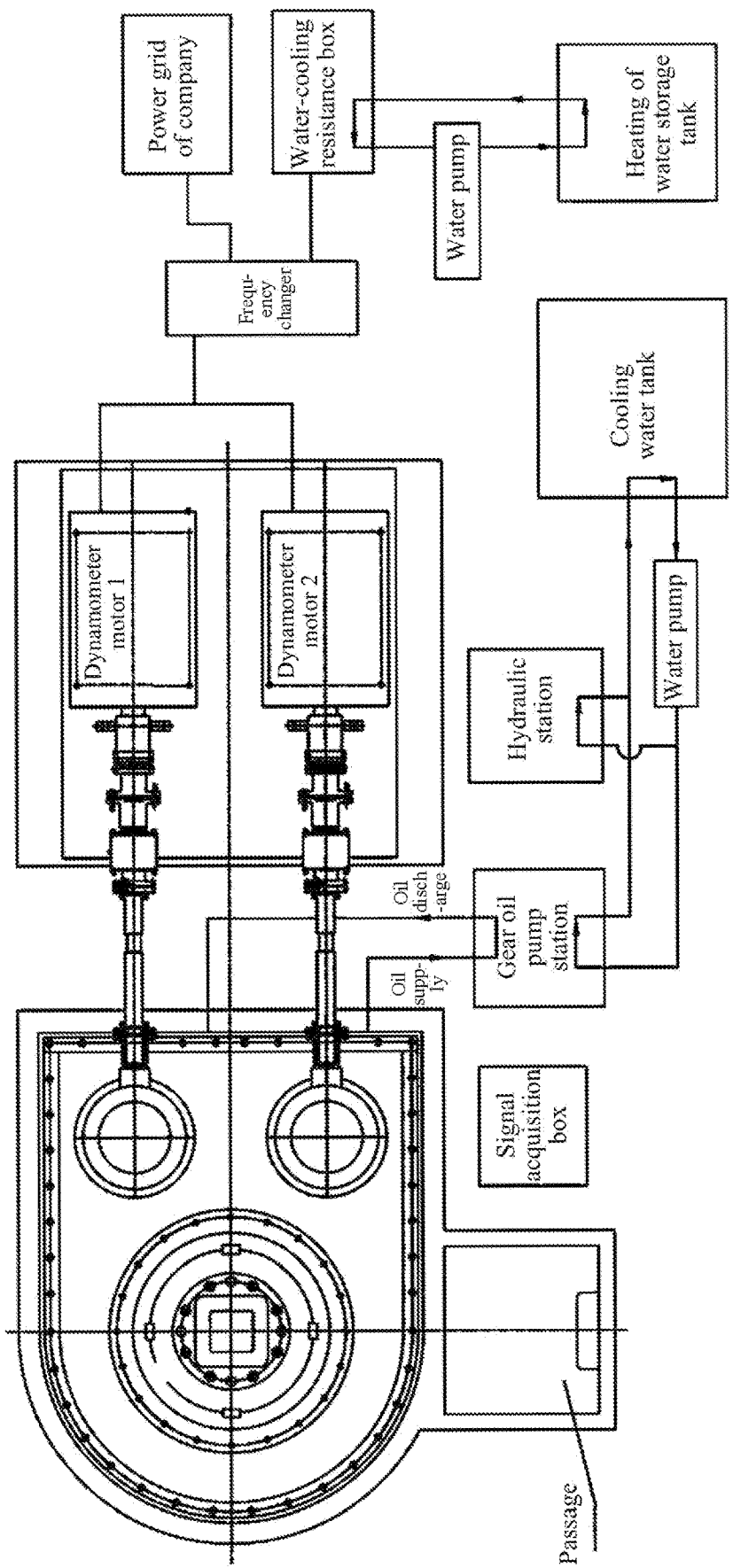
FIG. 2 is a top view of a test device for testing and commissioning the comprehensive performance of a rotary drilling rig.

As shown in FIG. 1 and FIG. 2, a test device for testing and commissioning the comprehensive performance of a rotary drilling rig includes dynamometer motors 2, torque transmission gearbox 10, speed-increasing corner gearbox 6, and drive sleeve 8. The dynamometer motors 2 are provided on a foundation. The torque transmission gearbox 10 is fixed on gearbox anchoring plate 13 through gearbox adapter plate 12. The gearbox anchoring plate 13 is pre-buried in the foundation. The speed-increasing corner gearbox 6 is provided on the torque transmission gearbox 10. The speed-increasing corner gearbox 6 is connected to the dynamometer motors 2 through transmission shaft 5, torque sensor 4, and motor coupling 3 sequentially. The drive sleeve 8 is provided in connecting shaft 9 of the torque transmission gearbox 10. A lower end of the drive sleeve 8 is connected to hydraulic loading cylinder 18 through rotating bearing I 14, rotating support 15, and tension-pressure sensor 17. The rotating support 15 is fixed in the foundation. The hydraulic loading cylinder 18 is connected to a hydraulic station through a hydraulic pipe. The tension-pressure sensor 17 and a pressure control valve for the loading cylinder in the hydraulic station are connected to a computer software control system. The torque sensor 4 is connected to the computer software control system. The dynamometer motors 2 are in parallel connection with a power grid in a distribution room and a water-cooling resistance box.

The following descriptions describe further aspects of the preferred embodiment of the connection of the dynamometer motors above:

Two dynamometer motors 2 are respectively connected to the speed-increasing corner gearbox 6 through the motor coupling 3, the torque sensor 4, and the transmission shaft 5 for transmission. The two dynamometer motors 2 are provided on motor base 1. The motor base 1 is provided on a motor base anchoring plate pre-buried in the foundation and is fastened by a foundation bolt.

The following descriptions describe further aspects of the preferred embodiment of the connection of the hydraulic loading cylinder above:

The hydraulic loading cylinder 18 is connected to cylinder support 19 through a hinge pin. The cylinder support 19 is fixed on cylinder support anchoring plate 20 pre-buried in the foundation.

Further, guide mechanism 16 is provided at each of two sides of the rotating support 15. Through the interaction between the rotating bearing I 14 and the guide mechanism 16, a torque loading test and a lifting and pressurizing test of a drill pipe can be performed at the same time.

Figure 3:
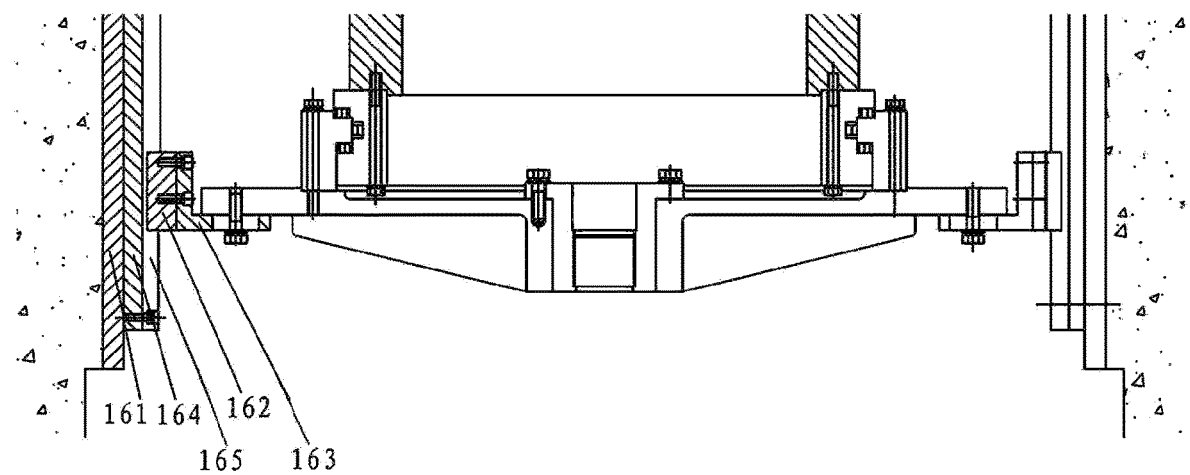
FIG. 3 is an enlarged view of a guide mechanism.

Specifically, as shown in FIG. 3, the guide mechanism 16 is provided at each of the two sides of the rotating support 15. The guide mechanism 16 includes guide anchoring plate 161, guide member 162, guide member support 163, and adjustment backing plate 164. The guide anchoring plate 161 and the foundation bolt are pre-buried in a foundation wall. The guide anchoring plates 161 on two sides are parallel to each other. The adjustment backing plate 164 is provided on the guide anchoring plate 161 and is fastened by a nut. Guide key 165 is fastened on the adjustment backing plate 164 by a bolt. Each of the two sides of the rotating support 15 is provided with the guide member support 163 and the guide member 162. A key slot is formed in the guide member 162. The key slot matches the guide key 165 on the adjustment backing plate 164.

Further, the test device further includes a cooling system. The cooling system includes a cooling water tank, a pipe, and a water pump. The cooling water tank is connected to the water pump, the water-cooling resistance box, the hydraulic station, and a gear oil pump station through the pipe. The torque transmission gearbox 10 and the speed-increasing corner gearbox 6 are respectively connected to the gear oil pump station. An oil supply temperature sensor, an oil discharge temperature sensor, and an oil discharge pressure sensor of the gear oil pump station are connected to the computer software system.

Referring also to FIG. 1 and FIG. 2, a square head of a drill pipe of the rotary drilling rig is connected to the drive sleeve 8, such that torque is transmitted to the connecting shaft 9 through the drive sleeve 8. Rotating bearing II 11 is connected to the connecting shaft 9, and the rotating bearing II 11 is engaged with pinion 7, such that power is transmitted to the speed-increasing corner gearbox 6 through the pinion 7.

It is to be noted that data acquired by each sensor is connected to a host ECU of the rotary drilling rig to timely detect host parameters in a working state of each of rotary drilling rigs of different types.

A test method for testing and commissioning the comprehensive performance of a rotary drilling rig includes the following steps:

A square head of a drill pipe of the rotary drilling rig is connected to drive sleeve 8, such that torque is transmitted to connecting shaft 9 through the drive sleeve 8. Rotating bearing II 11 is connected to the connecting shaft 9, and the rotating bearing II 11 is engaged with pinion 7, such that power is transmitted to speed-increasing corner gearbox 6 through the pinion 7. The speed-increasing corner gearbox 6 transmits the torque to dynamometer motors 2 through transmission shaft 5, torque sensor 4, and motor coupling 3. A computer receives a torque signal from the torque sensor 4 and directly controls the dynamometer motors through software, thereby controlling a load and realizing a torque loading test of the complete machine. The drill pipe transmits a pressurizing force and a lifting force to hydraulic loading cylinder 18 through the drive sleeve 8, rotating bearing I 14, rotating support 15, and tension-pressure sensor 17. The computer sets and controls a pressurizing load and a lifting load of the hydraulic loading cylinder 18, thereby realizing a lifting and pressurizing test of the drill pipe. Through the interaction between the rotating bearing I 14 and guide mechanism 16, the torque loading test and the lifting and pressurizing test of the drill pipe can be performed at the same time. A data acquisition system reserves a CAN communication path to connect a host ECU of the rotary drilling rig, thereby timely detecting various host parameters in a working state of each of rotary drilling rigs of different types, such as a pressure of a primary pump, a pressure of a secondary pump, a forward rotating pressure of a power head, a reverse rotating pressure of the power head, a torque of an engine, a rotational speed of the engine, an oil consumption of the engine, a water temperature of the engine, a pressure of a machine oil, a temperature of a hydraulic oil, and oil consumption of the engine, and realizing a comprehensive performance test and a data analysis test, including functions such as comprehensive data monitoring and theoretical verification on a torque load, tension and pressure of the drill pipe, and operation of the complete machine, etc. With analysis of various technical parameters, the product design is optimized, the product quality and performance are improved, and a reliable scientific basis is provided for the development of a high-quality and high-standard rotary drilling rig.

In addition to providing loads for the system, the dynamometer motors 2 in the torque loading test act as generators and generate a large amount of electric energy in the experiment. The dynamometer motors 2 are connected to the water-cooling resistance box and the power grid through a frequency changer. A flow direction of electric energy generated by the dynamometer motors is controlled by the computer system and the frequency changer, such that a certain percentage of the electric energy is returned to the power grid for utilization, and the remaining percentage of the electric energy is used for heating water in a water storage tank through the water-cooling resistance box to clean a vehicle, thereby realizing effects of energy recycling, energy saving, and environmental protection.

Therefore, the present disclosure achieves the following effects over the prior art:

1. The testbed can simulate actual working conditions automatically according to a load spectrum for the torque loading test. During automatic simulation for the loading test, the present disclosure timely monitors various host parameters of the rotary drilling rig under different load torques, including the torque of a power head, the rotational speed and power of the power head, the pressure of a primary pump, the pressure of a secondary pump, the forward rotating pressure of the power head, the rotational speed of an engine, the torque of the engine, and the temperature of hydraulic oil, and fits the measured parameters with characteristic curves to check whether the parameters meet acceptance requirements. The present disclosure first uses AC generators as loads in China, has a millisecond-level sensitivity for load control, and can provide a high-frequency alternating load and an abrupt changing load. Consequently, in case of an abrupt change of the load torque, the present disclosure can timely monitor the impact resistance of the hydraulic system and the stability of the complete machine.

During the construction of the rotary drilling rig, such parameters as the lifting force of the main winch, the pressurizing force and the lifting force of a pressurizing cylinder of the power head, and the pressurizing force and the lifting force of a pressurizing winch are important considerations to achieve the construction efficiency. The testbed is provided with a novel rotating, pressurizing, and guiding compound mechanism for performing simultaneous rotation and pressurization during the commissioning of the rotary drilling rig, thus detecting whether the lifting force and pressurizing force of the rotary drilling rig under different torque loads meet acceptance criteria.

2. The present disclosure creates a novel application field to which the power feedback technology is applied and recycles the energy. The dynamometer motors that provide loads for the torque loading test are substantively generators. While actual working conditions are simulated according to the load spectrum to automatically perform the torque loading test, the energy of a fuel is converted into mechanical energy through the engine, hydraulic system, mechanical transmission system, and so on, thereby driving the dynamometer motors to generate electric energy. The electric energy can be distributed freely by an operating system according to any proportion. Specifically, a certain proportion of the electric energy is used for heating water in a water storage tank to clean a vehicle, and the remaining proportion of the electric energy is returned to a power grid of the company for routine production. While meeting loading and commissioning requirements for simulating the actual working conditions, the testbed solves the problem that energy of a fuel consumed by the rotary drilling rig cannot be recycled in conventional borehole commissioning and conventional hydraulic dynamometer integrated testbed commissioning, which opens up a novel application field to which the power feedback technology is applied.

3. The present disclosure provides a high-end testbed for the development and design of the novel product. Torque values can be input manually on the testbed for loading. During the development and design of the novel product, when corresponding relationships between the rotational speed of the power head, the power of the power head, the pressure of the primary pump, and the pressure of the secondary pump are tested under a given torque, control software of the testbed can output characteristic curves of various parameters for data statistics and analysis.

The testbed can acquire such parameters as the rotational speed of the engine, the torque of the engine, the pressure of the primary pump, the displacement of the primary pump, and the rotational speed of the power head under different torques and pressures, automatically fits the output characteristic curves of the engine, pump and motor in a working state of the system, and compares the output characteristic curves with given characteristic curves of the manufacturer to detect whether the hydraulic system matches the selected model of the hydraulic system and to obtain the hydraulic efficiency, all of which are of great significance to optimize the product design and improve the product performance.

The testbed can measure the maximum output torque of the rotary drilling rig, the maximum lifting force of the main winch, the maximum lifting force and the maximum pressurizing force of the pressurizing winch, and the maximum pressurizing force and the maximum lifting force of the pressurizing cylinder, which provides more accurate data to support accurate adjustment of the parameters, optimization of the product design, and improvement of the product quality and performance.

4. The reliability test on the drill pipe is realized. Stress-strain induction patches are attached at different positions of the drill pipe. When a load is applied to the rotary drilling rig according to the load spectrum in the simulated actual working conditions, the present disclosure timely detects and records the stress and strain of each patch and analyzes stress distribution of the drill pipe in construction, which provides critical data to support research to find a more reliable and durable drill pipe and solve cracking of the drill pipe.

Finally, it should be noted that the above embodiments are merely intended to describe, rather than to limit, the technical solutions of the present disclosure. Although the present disclosure is described in detail by referring to the preferred embodiment, those of ordinary skill in the art should understand that they may still make modifications to the specific embodiments of the present disclosure or make equivalent substitutions to some of the technical solutions of the present disclosure without departing from the spirit of the technical solutions of the present disclosure. However, these modifications or equivalent substitutions shall fall within the protection scope of the technical solutions of the present disclosure.

What is claimed is:

1. A test device for testing and commissioning comprehensive performance of a rotary drilling rig, comprising:
   dynamometer motors provided on a foundation;
   a torque transmission gearbox fixed on a gearbox anchoring plate through a gearbox adapter plate;
   a speed-increasing corner gearbox provided on the torque transmission gearbox, and connected to the dynamometer motors through a transmission shaft, a torque sensor, and a motor coupling sequentially; and
   a drive sleeve provided in a connecting shaft of the torque transmission gearbox, wherein a lower end of the drive sleeve is connected to a hydraulic loading cylinder through a first rotating bearing, a rotating support, and a tension-pressure sensor, and the hydraulic loading cylinder is connected to a hydraulic station through a hydraulic pipe;
   wherein the tension-pressure sensor and a pressure control valve for the hydraulic loading cylinder are in the hydraulic station; and the dynamometer motors are in parallel connection with a power grid in a distribution room and a water-cooling resistance box.

2. The test device for testing and commissioning the comprehensive performance of the rotary drilling rig according to claim 1, wherein two dynamometer motors are respectively connected to the speed-increasing corner gearbox through the motor coupling, the torque sensor, and the transmission shaft for transmission; and
   the two dynamometer motors are provided on a motor base, the motor base is provided on a motor base anchoring plate pre-buried in the foundation, and the motor base is fastened by a foundation bolt.

3. The test device for testing and commissioning the comprehensive performance of the rotary drilling rig according to claim 1, wherein the hydraulic loading cylinder is connected to a cylinder support through a hinge pin, and the cylinder support is fixed on a cylinder support anchoring plate pre-buried in the foundation.

4. The test device for testing and commissioning the comprehensive performance of the rotary drilling rig according to claim 1, wherein a guide mechanism is provided at each of two sides of the rotating support;
   the guide mechanism comprises a guide anchoring plate, a guide member, a guide member support, and an adjustment backing plate;
   the guide anchoring plate is pre-buried in a foundation wall, and guide anchoring plates on two sides are parallel to each other;
   the adjustment backing plate is provided on the guide anchoring plate, and a guide key is fastened on the adjustment backing plate; and
   each of the two sides of the rotating support is provided with the guide member support and the guide member, a key slot is formed in the guide member, and the key slot matches the guide key on the adjustment backing plate.

5. The test device for testing and commissioning the comprehensive performance of the rotary drilling rig according to claim 1, further comprising:
a lubricating system, wherein the lubricating system comprises a gear oil pump station, and the gear oil pump station is respectively connected to the torque transmission gearbox and the speed-increasing corner gearbox; and
an oil supply temperature sensor, an oil discharge temperature sensor, and an oil discharge pressure sensor of the gear oil pump station.

6. The test device for testing and commissioning the comprehensive performance of the rotary drilling rig according to claim 5, wherein host parameters are detected in a working state of each of rotary drilling rigs of different types.

7. The test device for testing and commissioning the comprehensive performance of the rotary drilling rig according to claim 5, further comprising a cooling system, wherein the cooling system comprises a cooling water tank, a pipe, and a water pump; and
the cooling water tank is connected to the water pump, the hydraulic station, and the gear oil pump station through the pipe.

8. The test device for testing and commissioning the comprehensive performance of the rotary drilling rig according to claim 1, wherein a square head of a drill pipe of the rotary drilling rig is connected to the drive sleeve, such that a torque is transmitted to the connecting shaft through the drive sleeve; and a second rotating bearing is connected to the connecting shaft, and the second rotating bearing is engaged with a pinion, such that a power is transmitted to the speed-increasing corner gearbox through the pinion.

9. The test device for testing and commissioning the comprehensive performance of the rotary drilling rig according to claim 1, wherein the dynamometer motors are connected to the water-cooling resistance box and the power grid through a frequency changer; and a flow direction of electric energy generated by the dynamometer motors is controlled by the frequency changer, such that a preset percentage of the electric energy is returned to the power grid for utilization, and a remaining percentage of the electric energy is used for heating water in a water storage tank through the water-cooling resistance box to clean a vehicle.

10. A test method for testing and commissioning comprehensive performance of a rotary drilling rig, comprising:
connecting a square head of a drill pipe of the rotary drilling rig to a drive sleeve, such that a torque is transmitted to a connecting shaft through the drive sleeve; connecting a second rotating bearing to the connecting shaft, and engaging the second rotating bearing with a pinion, such that a power is transmitted to a speed-increasing corner gearbox through the pinion; transmitting, by the speed-increasing corner gearbox, the torque to dynamometer motors through a transmission shaft, a torque sensor and a motor coupling; and receiving a torque signal from the torque sensor, and directly controlling the dynamometer motors through software, thereby controlling a load, and realizing a torque loading test of the rotary drilling rig;
transmitting, by the drill pipe, a pressurizing force and a lifting force to a hydraulic loading cylinder through the drive sleeve, a first rotating bearing, a rotating support and a tension-pressure sensor; and setting and controlling a pressurizing load and a lifting load of the hydraulic loading cylinder, thereby realizing a lifting and pressurizing test of the drill pipe; and
reserving a controller area network (CAN) communication path to timely detect various host parameters in a working state of each of rotary drilling rigs of different types.

* * * * *